United States Patent
Tanaka et al.

(10) Patent No.: US 7,374,245 B2
(45) Date of Patent: May 20, 2008

(54) VEHICULAR SEAT

(75) Inventors: Yukio Tanaka, Kanagawa (JP);
Kazuhito Kashima, Kanagawa (JP);
Ritsuro Okano, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 123 days.

(21) Appl. No.: 11/259,076

(22) Filed: Oct. 27, 2005

(65) Prior Publication Data

US 2006/0131945 A1    Jun. 22, 2006

(30) Foreign Application Priority Data

Oct. 28, 2004  (JP) .............................. 2004-314512

(51) Int. Cl.
  *B60N 2/02* (2006.01)
  *B60N 2/12* (2006.01)
  *B60N 2/22* (2006.01)
(52) U.S. Cl. .................. 297/343; 297/14; 297/330; 297/341; 297/362.11
(58) Field of Classification Search .................. 297/14, 297/325, 343, 330, 341, 362.11
See application file for complete search history.

(56) References Cited

U.S. PATENT DOCUMENTS

| | | | | |
|---|---|---|---|---|
| 2,859,797 A | * | 11/1958 | Mitchelson | ............. 297/342 X |
| 5,112,109 A | * | 5/1992 | Takada et al. | ............... 297/343 |
| 5,516,195 A | * | 5/1996 | Canteleux | ................ 297/284.1 |
| 5,558,399 A | * | 9/1996 | Serber | .................... 297/343 X |
| 5,735,574 A | * | 4/1998 | Serber | .................... 297/343 X |
| 6,474,737 B1 | | 11/2002 | Canteleux et al. | |
| 7,229,118 B2 | * | 6/2007 | Saberan et al. | ......... 297/341 X |

FOREIGN PATENT DOCUMENTS

JP     2002-345589    12/2002

* cited by examiner

*Primary Examiner*—Rodney B. White
(74) *Attorney, Agent, or Firm*—Jean C. Edwards, Esq.; Akerman Senterfitt

(57) ABSTRACT

A vehicular seat has a seat cushion supported on a floor portion of a vehicle body panel, a seat back divided into a seat back upper and a seat back lower and controlled to be reclined, a seat back upper frame supporting the seat back upper and fixed to a rear portion of the vehicle body panel, a seat back lower frame supporting the seat back lower and rotatably connected to the seat back upper frame, a seat cushion frame supporting the seat cushion and a driving unit fixed to the floor portion and connected to the seat cushion frame so as to activate the seat cushion frame to tilt upwards and forwards. The seat cushion frame and the seat back lower frame are rotatably connected to each other so that the seat back lower is displaced forwards as the seat cushion frame is activated to tilt.

4 Claims, 6 Drawing Sheets

VEHICULAR SEAT

The present invention claims foreign priority to Japanese patent application No. 2004-314512, filed on Oct. 28, 2004, the contents of which is incorporated herein by reference.

BACKGROUND OF THE INVENTION

1. Field of the Invention

The present invention relates to a vehicular seat for use in a passenger car or the like and more particularly to a vehicular seat including a seat cushion which is supported on a floor portion of a vehicle body panel and a seat back which is vertically divided into two portions of a seat back upper and a seat back lower and is supported in such a manner as to be bent between the seat back upper and the seat back lower and controlled to be reclined.

2. Description of the Background Art

Conventionally, there is known a vehicular seat that is made up of a seat cushion in which an occupant is seated and a seat back which constitutes a backrest for the occupant wherein the seat back is vertically divided into two portions in such a manner as to be bent intermediately and controlled to be reclined (refer, for example, Japanese Patent Unexamined Publication No. JP-A-2002-345589 and U.S. Patent Examined Publication No. U.S. Pat. No. 6,474,737).

For example, a vehicular seat disclosed in the JP-A-2002-345589 is a rear seat for a sedan-type passenger vehicle, and as is shown in FIG. 5, a seat cushion frame 113 of a seat cushion 111 is supported on a bracket 121 on a floor portion 120a of a vehicle body panel 120 via a link arm 122, and a frame 114a for an upper half portion 112a of a seat back 112 is supported on a rear vertical wall portion 120b of the vehicle body panel 120 via link arms 124, 125.

In addition, a frame 114b for a lower half portion 112b of the seat back 112 is rotatably supported on a hinge bracket 126 which is secured to a lower side of the rear vertical wall portion 120b of the vehicle body panel 120, the frames 114a and 114b are connected to each other via an elongated hole 127 that is formed in the frame 114b on an upper end side thereof in such a manner as to rotate and slide, and a lower end side of the frame 114b is rotatably connected with a seat cushion frame 113.

Then, when a motor 130 that is mounted on the rear wall portion 120b disposed back of the seat back 112 is driven to rotate, the link arms 124, 125 mounted on the frame 114a for the upper half portion 112a of the seat back 112 are then rotated, respectively, whereby the upper half portion 112a is moved in parallel in such a manner as be close to or separated apart from the rear vertical wall portion 120b. When the link arms 124, 125 are rotated counterclockwise, the upper half portion 112a of the seat back 112 moves downwards and in such a direction as to approach the rear vertical wall portion 120b as shown in FIG. 6, and the lower half portion 112b of the seat back 112 is caused to rotate clockwise by the relevant movement of the upper half portion 112a, whereby the seat back 112 is bent intermediately so as to be put in a reclined state. In addition, the seat cushion 111 is raised upwards by the link arm 122 in association with the rotation of the lower half portion 112b, whereby the vehicular seat 100 is moved to take a reclined posture.

Incidentally, in the conventional vehicular seat that has been described above, since the upper half portion of the seat back moves downwards when the a basic posture of the seat is shifted to a reclined posture thereof, the head of the occupant also moves downwards, whereby the height of the line of sight of the occupant is lowered to thereby narrow the field of vision thereof.

SUMMARY OF THE INVENTION

An object of the invention is to provide a vehicular seat which can be shifted from its basic posture to a reclined posture thereof without changing the height of the line of sight of the occupant.

With a view to attaining the object, according to a first aspect of the present invention, there is provided a vehicular seat comprising:

a seat cushion supported on a floor portion of a vehicle body panel;

a seat back vertically divided into two portions of a seat back upper and a seat back lower so that the seat back adopted to be bent between the seat back upper and the seat back lower, the seat back being controlled to be reclined;

a seat back upper frame supporting the seat back upper and fixed to a rear portion of the vehicle body panel at a back side of the seat back upper frame;

a seat back lower frame supporting the seat back lower and rotatably connected to the seat back upper frame at an upper portion thereof;

a seat cushion frame supporting the seat cushion; and a driving unit fixed to the floor portion, the driving unit connected to the seat cushion frame so as to activate the seat cushion frame to tilt upwards and forwards, wherein the seat cushion frame and the seat back lower frame are rotatably connected to each other so that the seat back lower is rotated to be displaced forwards as the seat cushion frame is activated to tilt.

In the vehicular seat that is configured as has been described above, the reclined posture can be formed by moving upwards and forwards a lower portion of the seat back lower and the seat cushion while the seat back upper remains fixed to the position of the vehicle body panel situated back thereof. Due to this, since the head of the occupant does not move even when the seated position (a hip position HP, shown in FIG. 4) of the occupant who is seated in the vehicular seat is moved upwards and forwards, the height of the line of sight of the occupant is not changed, and hence the field of vision of the occupant is allowed to remain unchanged.

In addition, according to a second aspect of the present invention, as set forth in the first aspect of the present invention, it is preferable that the driving unit is fixed to a cross-member portion on the floor portion.

In the event that the driving unit such as a motor is supported on the vehicle body panel which is situated back of the seat back as in the case with the conventional vehicular seat, a large drive force is required when the vehicular seat is shifted to the reclined posture with the occupant seated therein, and a reaction force generated then is exerted on the vehicle body panel which supports the driving unit, leading to a risk that the vehicle body panel may be deformed. With the driving unit fixed to the cross-member portion, however, a load generated borne by the driving unit when the seat is tilted can be borne, in turn, by the cross-member portion having a relatively high rigidity in an ensured fashion.

Further, according to a third aspect of the present invention, as set forth in the first aspect of the present invention, it is preferable that the driving unit is an electric unit.

According to the vehicular seat of the invention, the seat can be shifted the reclined posture without changing the height of the line of sight of the occupant.

DETAILED DESCRIPTION OF THE PREFERRED EMBODIMENTS

An embodiment of a vehicular seat according to the invention will be described in detail below by reference to the drawings.

Figure 1:
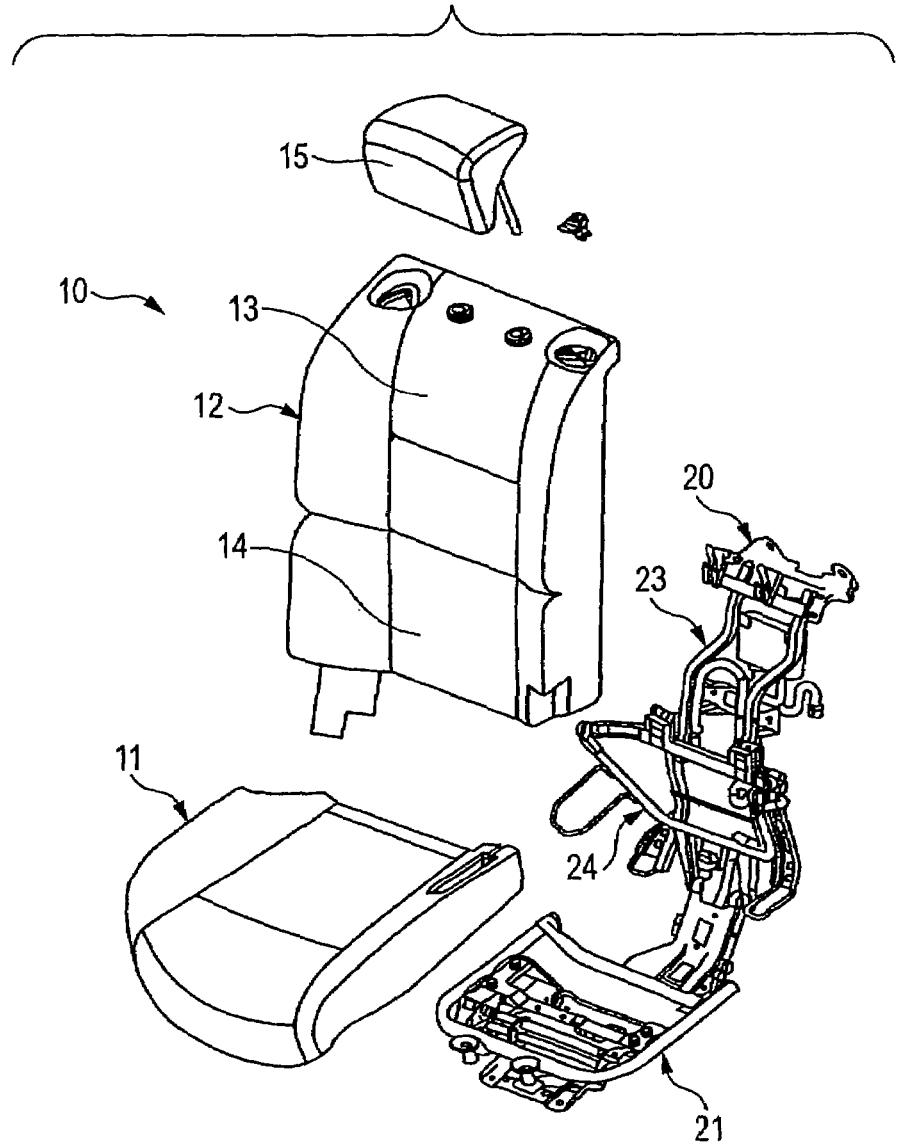
FIG. 1 is an exploded perspective view which shows an embodiment of a vehicular seat according to the invention.
Figure 2:
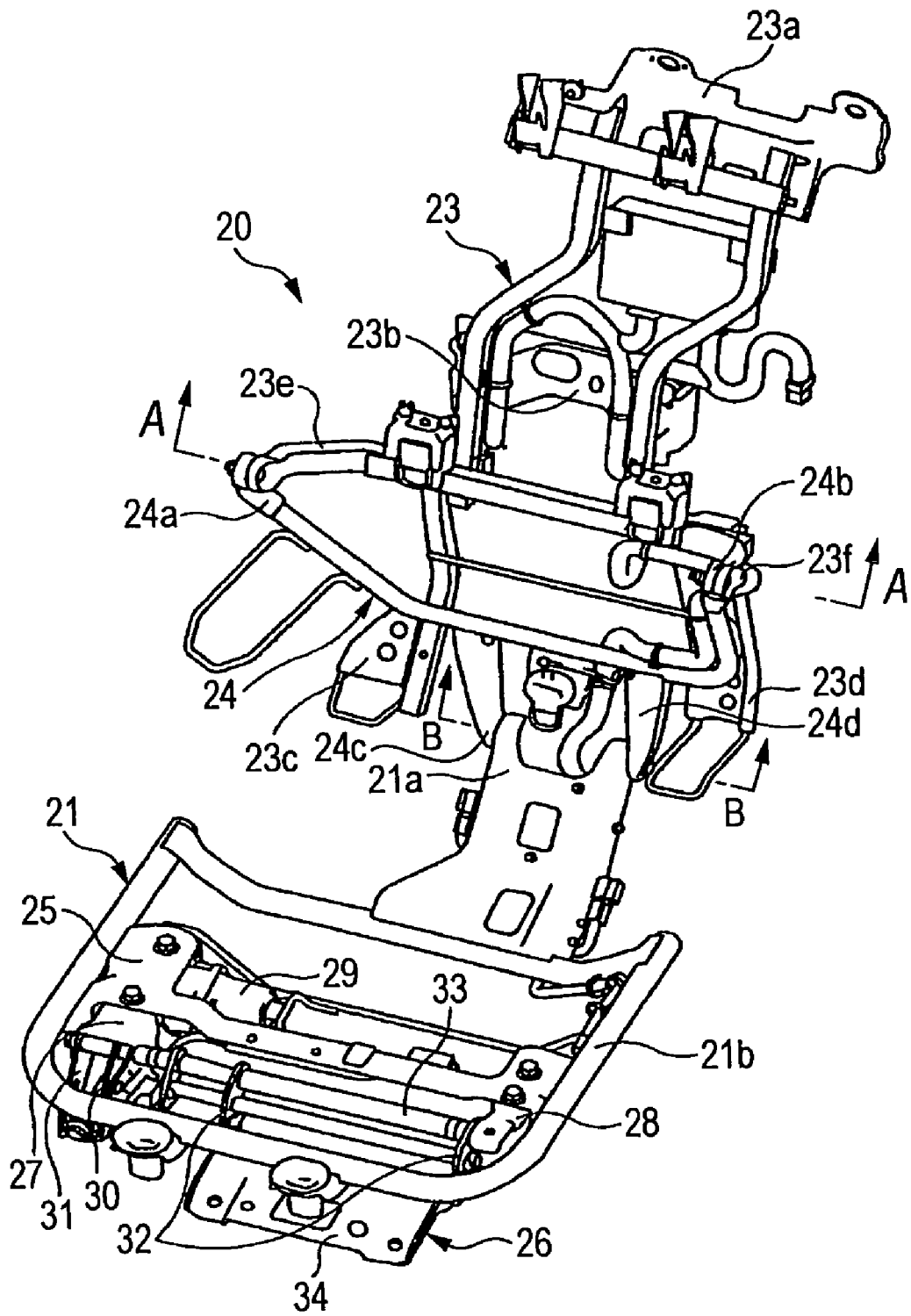
FIG. 2 is a perspective view which shows a frame portion shown in FIG. 1.
Figure 3:
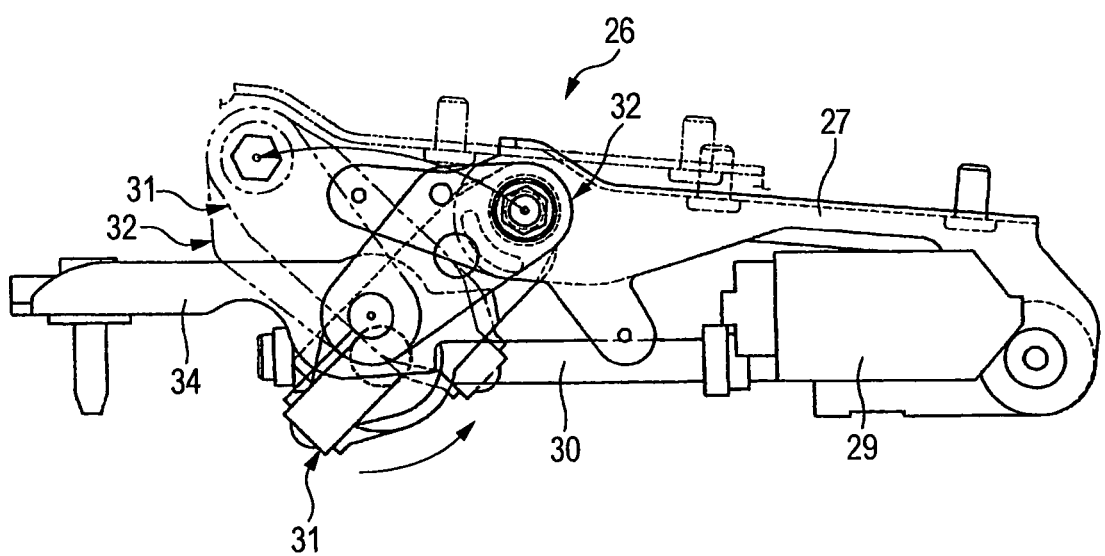
FIG. 3 is a schematic side view which shows a tilt movement produced by an electric unit.
Figure 4:
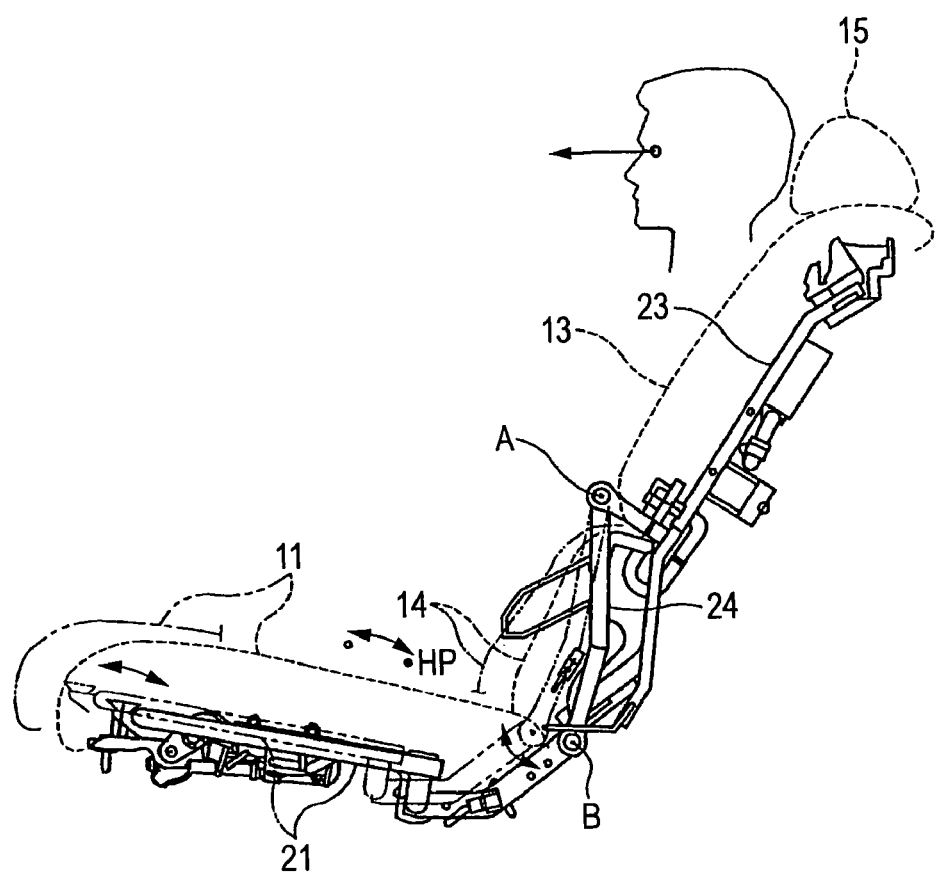
FIG. 4 is a schematic side view which shows the movement of the vehicular seat shown in FIG. 2.
Figure 5:
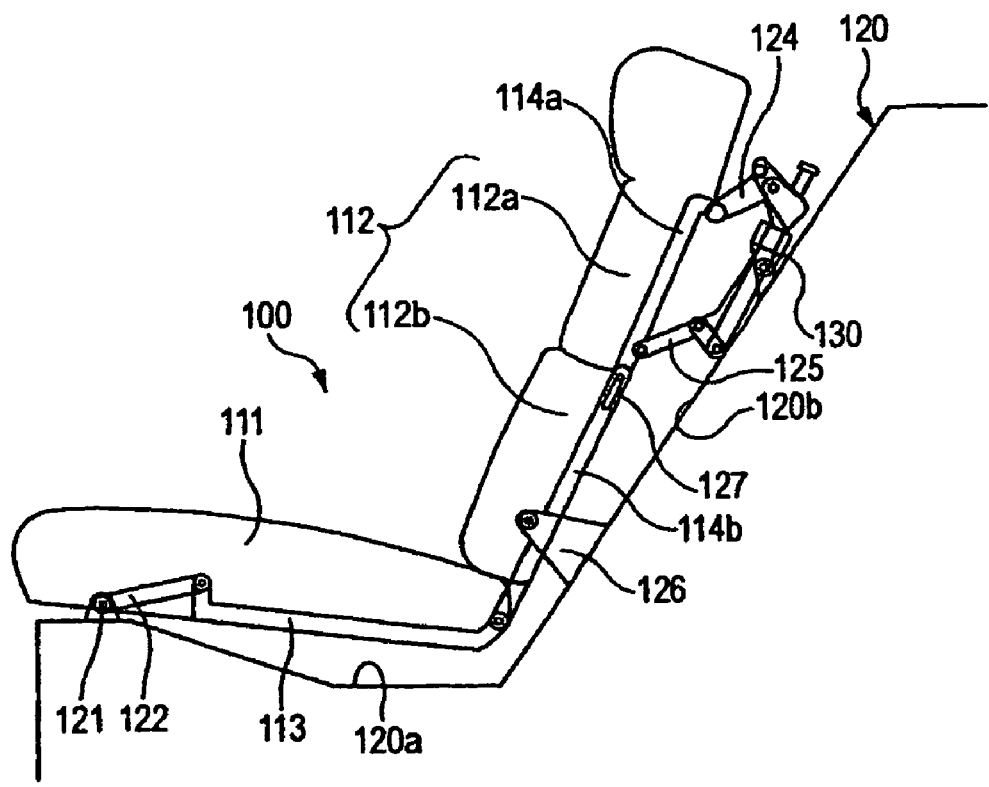
FIG. 5 is a schematic side view which shows an example of a conventional vehicular seat.
Figure 6:
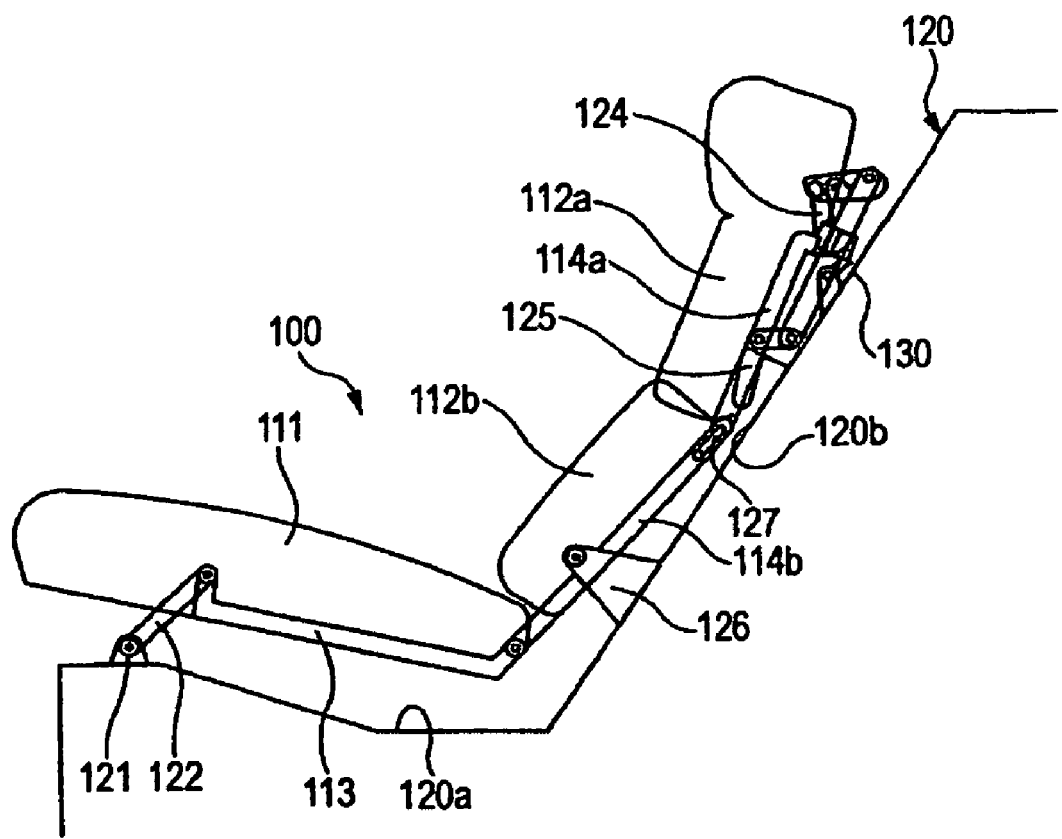
FIG. 6 is a schematic side view which shows a reclined posture of the vehicular seat shown in FIG. 5.

FIG. 1 is an exploded perspective view of a vehicular seat according to the embodiment, FIG. 2 is a perspective view of a frame portion the vehicular seat shown in FIG. 1, FIG. 3 is a schematic side view which shows a tilt movement of the vehicular seat produced by an electric unit shown in FIGS. 1 and 2, and FIG. 4 is a schematic side view which shows the movement of the vehicular seat shown in FIG. 2.

As shown in FIG. 1, a vehicular seat 10 of the embodiment is, for example, a rear seat for a sedan-type passenger vehicle and is generally made up of a seat cushion 11 in which the occupant is seated, a seat back 12 which constitutes a backrest which supports the back of the occupant and a frame portion 20 which supports the seat cushion 11 and the seat back 12. The seat back is vertically divided into two portions of a seat back upper 13 and a seat back lower 14 and is able to be bent intermediately. In addition, a headrest 15 is mounted on the seat back 12 detachably and in such a manner that the height thereof can be adjusted.

As shown in FIGS. 1 and 2, the frame portion 20 includes a seat back upper frame 23 which supports the seat back upper 13, a seat back lower frame 24 which supports the seat back lower 14 and a seat cushion frame 21 which supports the seat cushion 11.

The seat back upper frame 23 is a frame which extends from a back side of the seat back upper 13 to a back side of the seat back lower 14 and includes bolt fixing portions 23a, 23b, 23c, 23d at an upper portion, a central portion and a lower portion thereof. The seat back upper frame 23 is fixed at these bolt fixing portions 23a, 23b, 23c, 23d to a rear vertical wall portion (not shown) of a vehicle body panel which is situated back of the vehicular seat 10 with bolts which pass through bolt passing holes formed in the respective bolt fixing portions. In addition, the seat back upper frame 23 includes rotational support portions 23e, 23f which are connected to the seat back lower frame 24 so as to rotatably support the seat back lower frame 24. Note that this rotational center is shown as a rotational axis A in FIG. 2.

The seat back lower frame 24 is a frame which is disposed on the back side of the seat back lower 14 and includes upper rotational support portions 24a, 24b and lower rotational support portions 24c, 24d. The upper rotational support portions 24a, 24b are rotatably connected to the rotational support portions 23e, 23f of the seat back upper frame 23, whereby the seat back lower frame 24 is allowed to rotate about the rotational axis A. In addition, the lower rotational support portions 24c, 24d are rotatably connected to the seat cushion frame 21. Note that this rotational center is shown as a rotational axis B in FIG. 2.

The seat cushion frame 21 is a frame which is disposed underneath the seat cushion 11 and includes a rotational support portion 21a at the rear thereof. This rotational support portion 21a is rotatably connected to the lower rotational support portions 24c, 24d of the seat back lower frame 24, whereby the seat cushion frame 21 is allowed to rotate about the rotational axis B.

In addition, the seat cushion frame 21 has a plate-shaped electric unit fixing member 25 provided inside a frame 21b which constitutes an outer frame configuration of the seat cushion frame 21, and an electric unit 26 as a driving unit which controls the reclining movement of the vehicular seat is mounted on a lower side of the electric unit fixing member 25. Note that mounting portions 27, 28 are provided at transverse end portions of the electric unit 26, whereby the electric unit fixing member 25 is fixed with bolts to these mounting portions 27, 28.

As shown in FIGS. 2 and 3, the electric unit 26 includes a motor 29 as a driving source, a screw shaft 30 which converts a rotary motion of the motor 29 into a linear motion, a drive-side link 31 which is driven together with a nut fitted on the screw shaft 30, a connecting shaft 33 connected to the drive-side link 31, a driven-side link 32 connected to the connecting shaft 33 and a stationary plate 34 which rotatably supports the driven-side link 32. In addition, the mounting portions 27, 28 are fixed to both end portions of the connecting shaft 33, respectively. Then, the stationary plate 34 is fixed with bolts to a front cross-member portion on a floor portion of the vehicle body panel, whereby the seat cushion 11 is supported by the seat cushion frame 21 via the electric unit 26.

When the motor 29 is rotated to thereby rotate the drive-side link 31 and the driven-side link 32, the mounting portions 27, 28 are, as shown in FIGS. 3 and 4, tilt upwards and forwards and in association with this, the seat cushion frame 21 and the seat cushion 11 also tilt upwards and forwards. In addition, the lower portion of the seat back lower frame 24 which is connected to a rear end of the seat cushion frame 21 in such a manner as to rotate about the rotational axis B also moves upwards and forwards as the seat cushion frame 21 so tilts, whereby the seat back lower frame 24 rotates about the rotational axis A at the rotational support portions 24a, 24b which are situated at an upper portion of the seat back lower frame 24.

As the seat back lower frame 24 so rotates, the seated position (the hip position HP) on the seat cushion 11 moves upwards and forwards, and the seat back lower 14 rotates to be displaced forwards, whereby the seat back 12 is bent intermediately, and vehicular seat 10 is shifted from its basic posture to a reclined posture thereof. As this occurs, since the seat back upper frame 23 is fixed to the vehicle body panel, the seat back upper 13 is allowed to remain at its position, whereby the position of the head of the occupant who is seated in the vehicular seat remains unchanged, and hence the height of the line of sight of the occupant remains unchanged.

In addition, since the electric unit 26 is fixed to the front cross-member portion having the high rigidity on the floor portion, a load produced by a reaction force exerted on the electric unit 26 by the tilt movement of the vehicular seat 10 can be supported in an ensured fashion, the deformation of the vehicle body panel being thereby prevented.

Thus, as has been described heretofore, the vehicular seat according to the invention has the advantage that the height of the line of sight of the occupant is maintained to thereby maintain the field of vision of the occupant better when the vehicular seat is shifted from its basic posture to the reclined posture thereof and is useful in particular for use as a rear seat for a sedan-type passenger vehicle in which the vertical wall portion of the vehicle body panel to which the seat back upper frame can be fixed exists back of the seat. However, the vehicular seat of the invention can be applied to the rear seat of the sedan-type passenger vehicle.

Hereinbefore, the electric unit is explained as an example of the driving unit. Since the electric unit can be easily controlled by electrical signals or the like, the electrical power unit is suitable for the driving unit of the present invention. However, it can be adoptable as far as it activates the seat cushion frame to tilt upwards and forwards, for example, a spring member or manual operation is adoptable as a driving source of the driving unit.

While there has been described in connection with the preferred embodiments of the present invention, it will be obvious to those skilled in the art that various changes and modification may be made therein without departing from the present invention, and it is aimed, therefore,to cover in the appended claim all such changes and modifications as fall within the true spirit and scope of the present invention.

What is claimed is:

1. A vehicular seat comprising:
   a seat cushion frame that is adapted to be moveably supported on a floor portion of a vehicle body panel;
   a seat back frame that is coupled to the seat cushion frame, the seat back frame being divided into two portions comprising:
   a seat back upper frame that is adapted to be fixed to a wall portion of the vehicle body panel, the seat back upper frame being non-moveable relative to the wall portion of the vehicle body panel; and
   a seat back lower frame that is pivotally coupled to the seat back upper frame and the seat cushion frame, wherein the seat back frame is adapted to pivot between the seat back upper frame and the seat back lower frame, the seat back frame being controlled to be reclined; and
   a driving unit that is adapted to be coupled to the floor portion, the driving unit being connected to the seat cushion frame so as to activate the seat cushion frame to tilt upwards and forwards,
   wherein the seat cushion frame and the seat back lower frame are rotatably connected to each other so that the seat back lower frame is rotated to be displaced in a forward direction as the seat cushion frame is activated to tilt.

2. The vehicular seat as set forth in claim 1, wherein the driving unit is adapted to be fixed to a cross-member portion on the floor portion.

3. The vehicular seat as set forth in claim 1, wherein the driving unit is an electric unit.

4. The vehicular seat as set forth in claim 1, further comprising:
   a seat back upper cushion that is supported by the seat back upper frame;
   a seat back lower cushion that is supported by the seat back lower frame; and
   a seat cushion that is supported by the seat cushion frame.

* * * * *